(12) United States Patent
Bush (10) Patent No.: US 8,961,013 B2
(45) Date of Patent: Feb. 24, 2015

(54) RIGID SELF-SUPPORTING COLLAPSIBLE STACKABLE REUSABLE BAG

(71) Applicant: Erica Bush, Plano, IL (US)

(72) Inventor: Erica Bush, Plano, IL (US)

(73) Assignee: Erica Bush, Plano, IL (US)

( * ) Notice: Subject to any disclaimer, the term of this patent is extended or adjusted under 35 U.S.C. 154(b) by 305 days.

(21) Appl. No.: 13/631,895

(22) Filed: Sep. 29, 2012

(65) Prior Publication Data

US 2014/0093188 A1    Apr. 3, 2014

(51) Int. Cl.
*B65D 33/00* (2006.01)
*B65D 30/00* (2006.01)
*B65D 33/02* (2006.01)

(52) U.S. Cl.
USPC .............. 383/32; 383/37; 383/33; 383/104; 383/119; 190/107; 190/124; 190/127; 220/495.01; 220/495.06

(58) Field of Classification Search
USPC ............ 383/6, 32, 33, 37, 84, 104, 119, 127; 119/474, 498; 220/495.01, 495.06; 190/107, 122, 124, 127
See application file for complete search history.

(56) References Cited

U.S. PATENT DOCUMENTS

| 1,846,542 | A | * | 2/1932 | Budd | 383/15 |
|---|---|---|---|---|---|
| 2,331,966 | A | * | 10/1943 | Eisgrau | 383/104 |
| 2,544,075 | A | * | 3/1951 | Ernst et al. | 383/33 |
| 2,678,768 | A | * | 5/1954 | Vergobbi | 383/106 |
| 2,802,617 | A | * | 8/1957 | Roper | 383/98 |
| 3,118,588 | A | * | 1/1964 | Noble | 229/117.27 |
| 3,130,896 | A | * | 4/1964 | Mack | 206/521 |
| 4,138,054 | A | * | 2/1979 | Spencer | 383/119 |
| 4,160,496 | A | * | 7/1979 | Knight | 190/107 |
| 4,210,230 | A | * | 7/1980 | Weiner | 190/107 |
| 4,499,599 | A | * | 2/1985 | Polett et al. | 383/6 |
| 4,629,040 | A | * | 12/1986 | Jones | 190/102 |
| 4,900,163 | A | * | 2/1990 | Mack | 383/119 |
| 5,403,095 | A | * | 4/1995 | Melk | 383/110 |
| 6,045,263 | A | * | 4/2000 | Keller et al. | 383/33 |
| 6,065,873 | A | * | 5/2000 | Fowler | 383/104 |
| 6,068,095 | A | * | 5/2000 | Glembocki et al. | 190/127 |
| 6,068,402 | A | * | 5/2000 | Freese et al. | 383/110 |
| 6,102,570 | A | * | 8/2000 | Bull | 383/127 |
| 6,109,404 | A | * | 8/2000 | Bishop | 190/125 |
| 6,409,076 | B1 | * | 6/2002 | Wang | 229/122.34 |
| 6,920,993 | B2 | * | 7/2005 | Sheng-Bin | 220/6 |
| 6,926,129 | B2 | * | 8/2005 | Hoberman | 190/107 |
| 7,163,340 | B2 | * | 1/2007 | Godshaw et al. | 383/121 |
| 7,534,041 | B2 | * | 5/2009 | Godshaw et al. | 383/121 |
| 8,061,159 | B2 | * | 11/2011 | Mogil et al. | 62/457.7 |
| 2004/0223664 | A1 | * | 11/2004 | Martin et al. | 383/37 |
| 2005/0238261 | A1 | * | 10/2005 | Godshaw et al. | 383/40 |
| 2007/0025647 | A1 | * | 2/2007 | Hamlin | 383/14 |
| 2010/0260444 | A1 | * | 10/2010 | Narula et al. | 383/119 |

* cited by examiner

*Primary Examiner* — Jes F Pascua
*Assistant Examiner* — Peter Helvey (57) ABSTRACT

A self-supporting, rigid, and collapsible reusable bag made from flexible material and having a bottom, two first sidewalls, two second sidewalls, a top opening, and rigid insert. A rigid full-wall board is embedded in each of the two first sidewalls. A rigid insert comprised of at least one pair of sidewalls and bottom with substantially similar dimensions to the second sidewalls and bottom of the bag are placed in the interior and in frictional contact with the second sidewalls and bottom of the bag. The rigid insert sidewalls are held in place with securing devices located on the interior upper corners of the sidewalls of the bag. The bag can be collapsed by moving the rigid insert away from the second sidewalls and bottom to allow the second sidewalls to fold either inward or outward. A full-wall pocket is provided for each first sidewall to receive the full-wall board.

16 Claims, 11 Drawing Sheets

RIGID SELF-SUPPORTING COLLAPSIBLE STACKABLE REUSABLE BAG

CROSS-REFERENCE TO RELATED APPLICATION

Not Applicable

STATEMENT REGARDING FEDERALLY SPONSORED RESEARCH OR DEVELOPMENT

Not Applicable

FIELD OF THE INVENTION

The present invention is in the technical field of receptacles to hold contents which in turn are to be eventually removed. More particularly, the present invention is in the technical field of reusable bags for holding many items including but not limited to groceries.

BACKGROUND OF THE INVENTION

This invention relates to reusable bags which are used primarily for, but not limited to holding groceries.

Grocery stores and supermarkets commonly supply consumers with bags to carry items they have purchased. Traditionally, these bags have been for one-time usage. In recent years concern for the environment has given rise to a need for reusable bags. While reusable bags have experienced a moderate increase in usage, the lack of change in shopper behavior has prevented the bags from becoming the preferred method for transporting groceries and other items. The most critical behavior change required to increase the popularity of reusable bags is for the shopper to remember to bring the reusable bags with them on their shopping trip.

Storing reusable bags is inconvenient. Unless buying limited quantities, shoppers can require anywhere from four to twelve reusable bags or even more. Reusable bags tend to be bulky and take up considerable space in vehicle storage areas, closets, or wherever they are being stored when not in use. The most common reusable bags are also unwieldy and have no good containment method—even when multiple reusable bags are stored within a single reusable bag, a considerable amount of space is required and may be unappealing to the shopper. Inconvenient storage methods perpetuate the lack of changes in shopper behavior.

Another problem of the reusable bag is the quantity of bags a shopper requires in order to carry all of their items. As with the traditional one-time use paper and plastic bags, the typical reusable bag offers just slightly more carrying capacity than the one-time use paper or plastic bag. The similarity in capacity between the reusable bag and the traditional paper or plastic bag means the shopper must bring a quantity of reusable bags that is nearly one-to-one in ratio with the number of paper or plastic bags he or she would otherwise use.

Yet another problem with reusable bags is they are typically made from flexible material and lack a rigid support structure to be self-supporting. As a result the contents of reusable bags tend to spill out while in transport.

Accordingly, it is desirable to provide a reusable bag which will change shopper behavior by being accessible when needed; collapsing to a flattened state to store neatly and efficiently; having an increased carrying capacity to reduce the overall number of reusable shopping bags needed; having a rigid self-supporting structure to prevent spillage and enable stacking; and decreasing the number of trips (e.g. from the vehicle to the house) to unload the reusable bags.

BRIEF SUMMARY OF THE INVENTION

The invention is directed to a novel reusable bag. Each bag includes a body of flexible and rigid material having a bottom, four (4) sidewalls extending in a generally vertical direction from the bottom to define an enclosed area with an open top, and including a removable insert made of stiff or rigid material. At least two (2) of the opposing walls are comprised of rigid material. A rigid insert is placed within the reusable bag to make the bag self-supporting. The rigid insert has a panel with two (2) articulated walls or flaps and is secured in place with fastening devices located along the inside of the bag sidewalls that receive the rigid insert flaps. When the rigid insert is removed the reusable bag collapses through the inward folding of the bottom and sidewalls that do not have a full-wall board of rigid material.

Accordingly, it is an object of this invention to provide an improved reusable bag that can be collapsed and stored in a flattened state in a vehicle storage compartment, or any small space. Another object of the invention is to provide a reusable bag with an increased carrying capacity. Yet another object of the invention is provide a self-supporting bag that can maintain its form during use to prevent its contents from spilling out. Still another object is for the invention to stack one bag compartment upon another such that the user may carry more reusable bags and subsequently reduce the number of trips to transport the bag contents from one place to another.

DETAILED DESCRIPTION OF THE INVENTION

Figure 1:
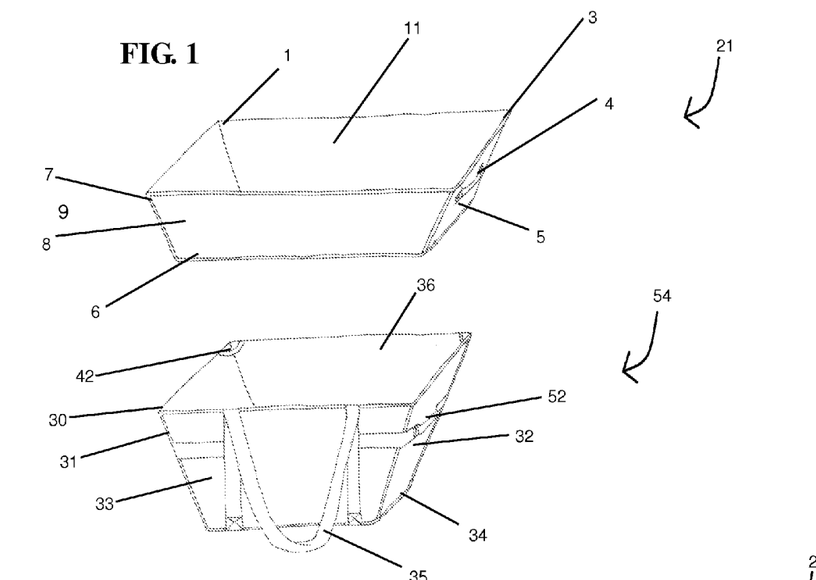
FIG. 1 is a side view of the top and bottom totes of the two-tote stacking reusable bag system in a self-supporting state in accordance with this invention.
Figure 2:
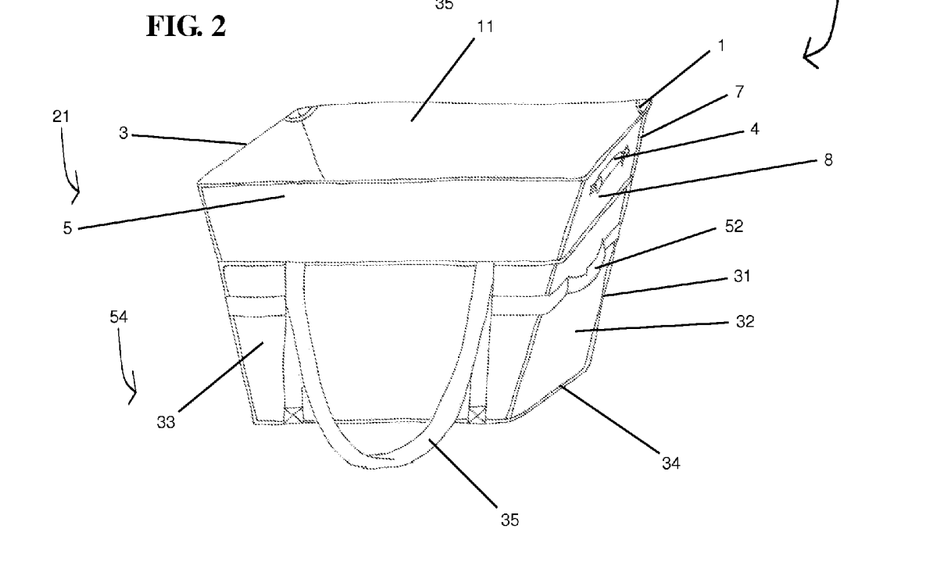
FIG. 2 is a side view of the two-tote stacking reusable bag system in a stacked state in accordance with this invention.

FIGS. 1 and 2 illustrate an exceptional reusable bag system 23 that can be easily erected, stacked, and collapsed in accordance with this invention. Bag system 23 is comprised of top tote 21 and bottom tote 54 which when stacked in accordance to this invention form body 23.

Top tote 21 and bottom tote 54 are preferably made from flexible non-woven polypropylene material and rigid cardboard. The flexible material can range from woven fabrics, such as canvas, to non-woven substances such as leather and polyvinyl chloride, and more than one flexible material may be used when constructing the bag system 23, such as a combination of non-woven polypropylene, canvas, vinyl, leather, or other flexible material that meets functional or styling design purposes. The rigid material can range from particle board, sheet metal, or even plastic and more than one rigid material may be used when constructing bag system 23. Bags 21 and 54 need not be formed from a single material but can, for example, have an outer wall of canvas and an inner wall of polypropylene for ease in cleaning. Other useful combinations will be apparent to those skilled in the art.

Figure 3:
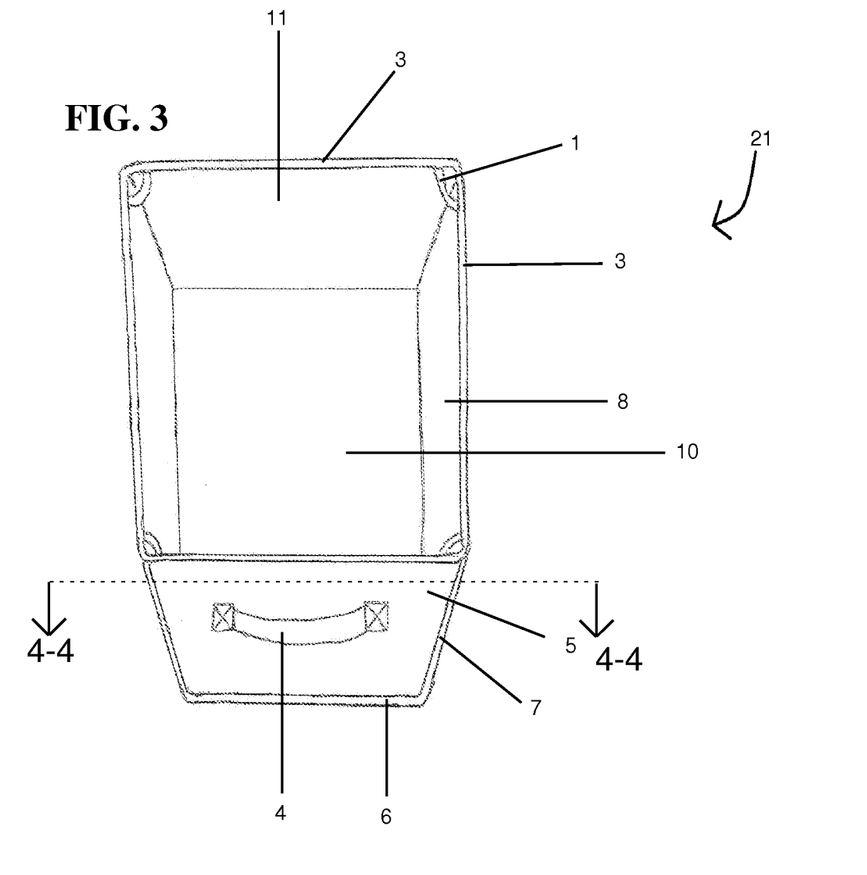
FIG. 3 is a top view of the top tote of the two-tote stacking reusable bag system in a self-supporting state in accordance with this invention.

As illustrated in FIG. 3, top tote body 21 has a bottom 10, two opposing rigid sidewalls 5, and two opposing flexible sidewalls 8. Each sidewall 5, 8 is permanently joined to the adjacent sidewall along both its vertical edges 7 to form a contiguous peripheral rectangular-shaped ring. Each sidewall 5, 8 is also permanently attached to bottom 10 along bottom edges 6, which edges 6 form the outer edge of bottom 10.

The union between sidewalls 5, 8 along vertical edges 7 and between sidewalls 5, 8 along bottom edges 6 establishes a top tote body 21 that is integral. Attachment of sidewalls 5 with sidewalls 8 or of sidewalls 5, 8 with bottom 10 is achieved by stitching, but adhesive or any other manner for connecting the walls and bottom known to those skilled in the art may be used.

Figure 4:
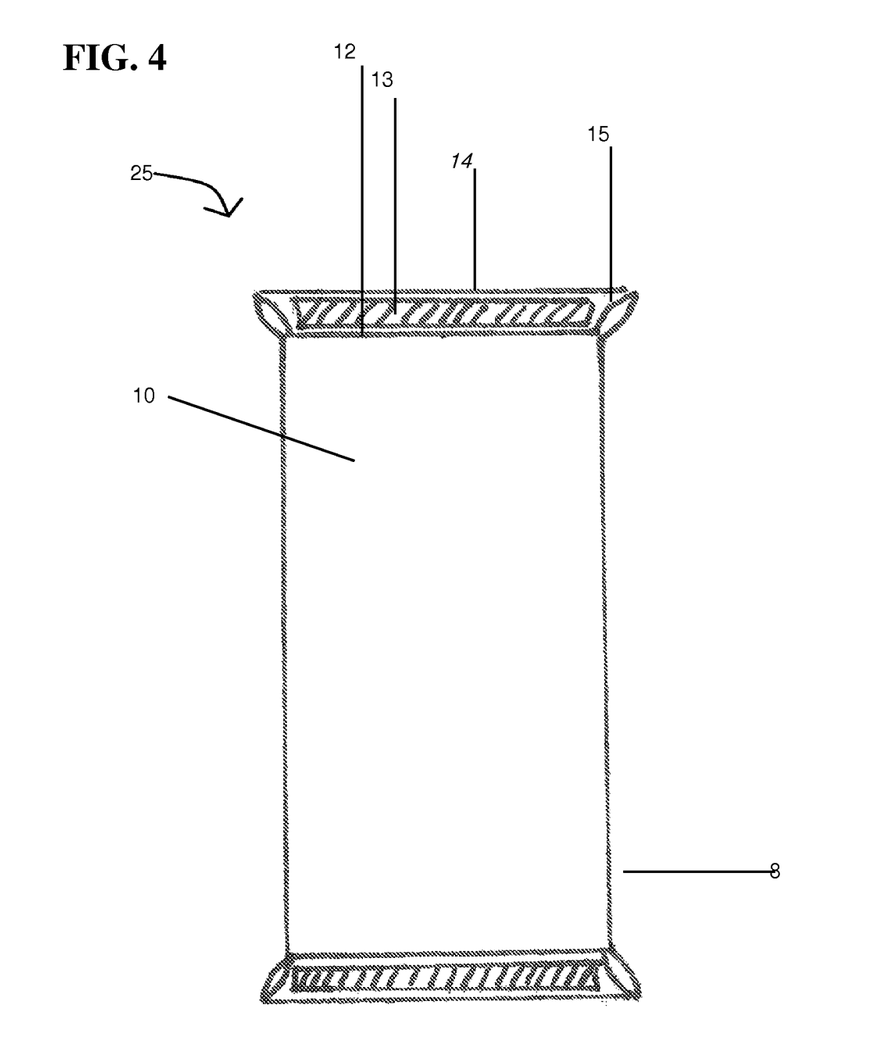
FIG. 4 is a top sectional view of the top tote of the two-tote stacking reusable bag system taken along horizontal section line 4-4 in FIG. 3.

Sidewalls 5 are rigid and situated opposite from each other within body 21. Sidewalls 5 are substantially congruent and extend up from the bottom edge 6. Each of sidewalls 5 is comprised of opposing flexible material with a hollow space between them to form a full-wall pocket 15 as shown in FIG. 4. Full-wall pocket 15 is formed from first inner-wall 12 and first outer-wall 14 being joined along vertical edges 7 and bottom edges 6. Full-wall pocket 15 is sized to receive a rigid full-wall board 13. Each full-wall board 13 is preferably thin with a height and width slightly less than the corresponding dimensions of the receiving full-wall pocket 15.

After full-wall boards 13 have been embedded within the full-wall pockets 15 of each rigid sidewalls 5, full-wall boards 13 are secured within full-wall pockets 15 by joining first inner-walls 12 to first outer-walls 14 along top edges 3.

Figure 5:
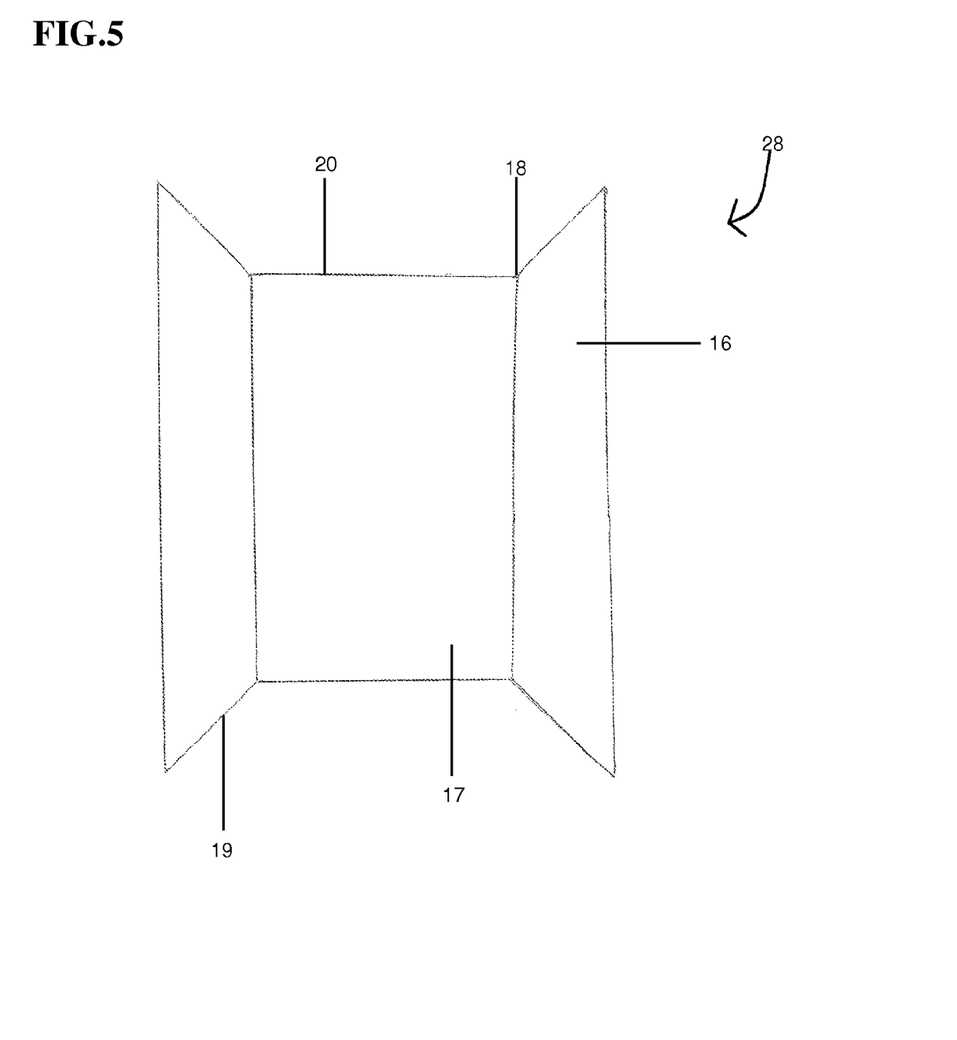
FIG. 5 is a top view of the removable rigid insert for the top tote of the two-tote stacking reusable bag system in accordance with this invention.
Figure 6:
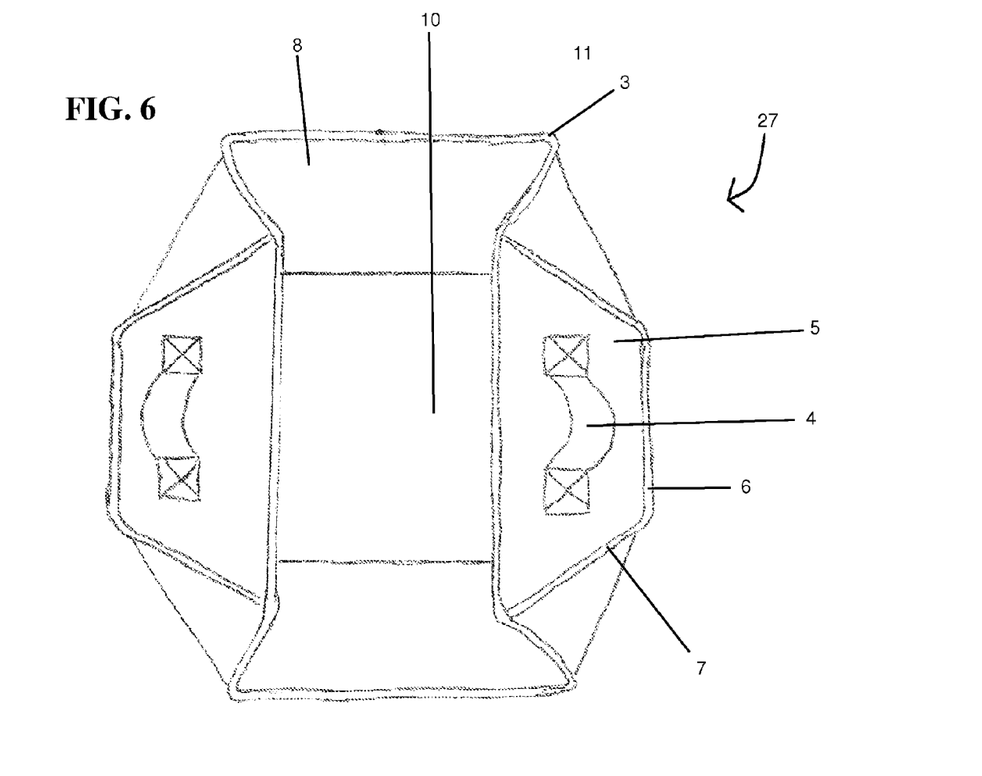
FIG. 6 is a perspective view of the top tote of the tote of the two-tote stacking reusable bag system in FIG. 3 being collapsed after the rigid insert has been removed.

Each full-wall board 13 and rigid insert body 28 shown in FIG. 5 provide reinforcement to sidewalls 8 and bottom 10. This reinforcement allows the flexible material of sidewalls 8 to stand upright when the top tote body 21 is erected. Full-wall boards 13 and rigid insert 28 also give sidewalls 8 and bottom 10 rigidity needed to increase the durability and the useful life of body 21. Moreover, such rigidity ensures that body 21 returns substantially to its intended shape despite being repeatedly collapsed and then re-erected. Full-wall boards 13 and rigid insert 28 are preferably made from cardboard but as noted particle board, sheet metal, plastic, or other rigid material can be used depending on the needed functionality and cost constraints.

Flexible sidewalls 8 are likewise opposite each other, substantially congruent and extend up from the bottom edge 6. Each second sidewall is attached along vertical edges 7 and bottom edges 6.

As illustrated in FIG. 5, the rigid insert for top tote body 21 is comprised of body 28, which is made from rigid cardboard. The rigid insert, body 28 is comprised of two articulated walls or flaps 16 with the height and width slightly less than sidewalls 8 and a panel 17 with the height and width slightly less than bottom 10. The two flaps 16 are opposing to each other and connect to opposing ends of 17. The flaps 16 and panel 17 are joined by seams 18. As shown in FIG. 5, attachment of the rigid insert flaps 16 with rigid panel 17 are achieved by preferably using the same material and joining the flaps 16 and panel 17 along seam 18 with stitches. These elements may also be joined using adhesive or any other manner known to those skilled in the art. It is only required to join adjacent portions without restricting flap movement along the rigid insert seams 18.

Figure 7:
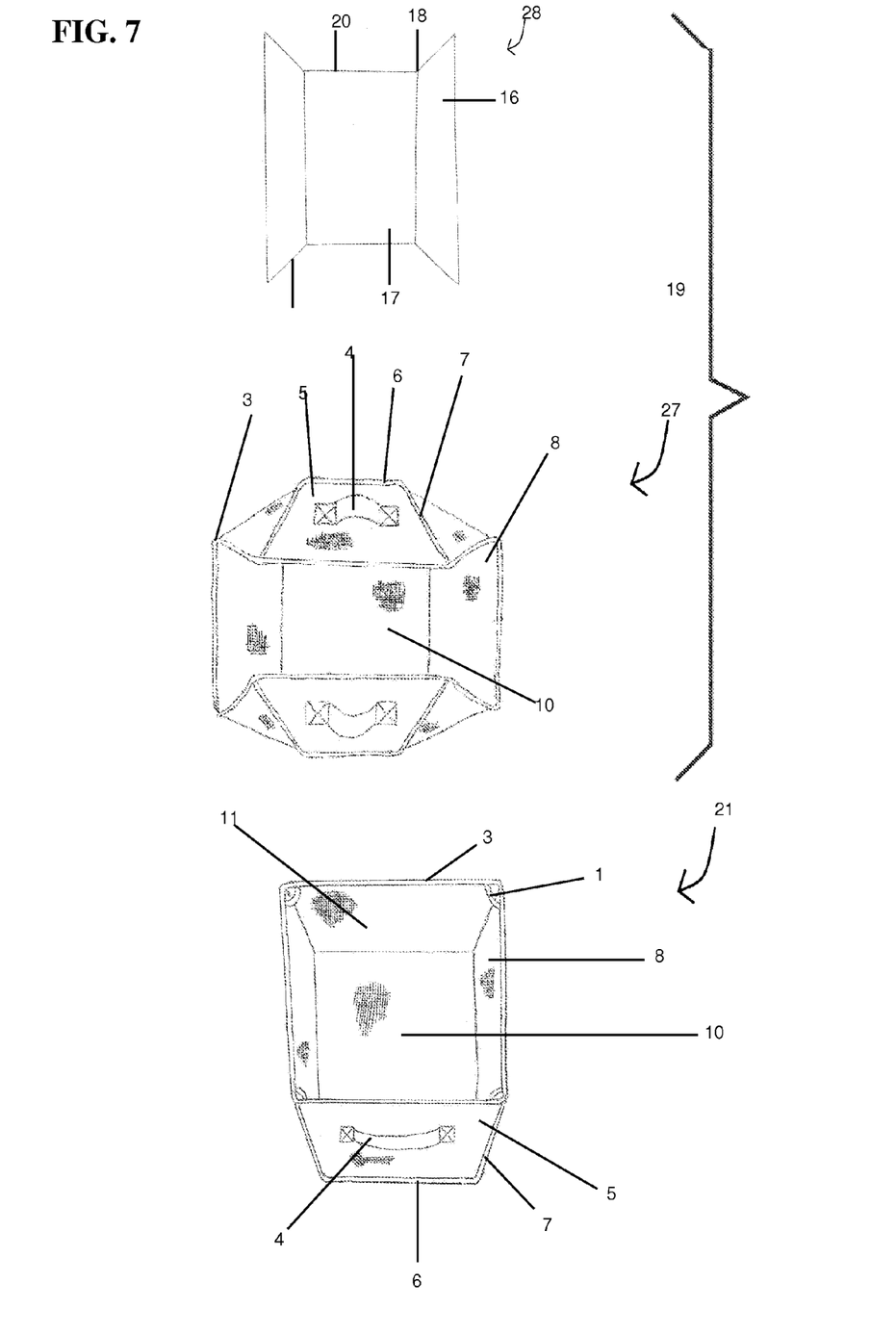
FIG. 7 is a perspective view of the top tote of the two-tote stacking reusable bag system demonstrating the reusable bag going from a collapsed to an erect state.

As shown in FIG. 7, to achieve the self-supporting state sidewalls 8 and bottom 10 of top tote body 21 receive rigid insert 28, such that rigid insert flaps 16 and rigid insert panel 17 are placed in contact with sidewalls 8 and bottom 10 of top tote body 21, respectively. The rigid insert flaps 16 are held in place with securing loops 1 sewn in the upper corners of top tote body 21, by wrapping the securing loops 1 around the corners of rigid insert flaps 16. When the securing loops 1 are wrapped around rigid insert flaps 16, the rigid insert flaps 16 provide rigidity to sidewalls 8 of top tote body 21. The self-supporting state for top tote body 21 is achieved when sidewalls 8, 5 and bottom 10 are rigid and/or are in frictional contact with rigid insert 28 simultaneously. Pivoting the rigid insert to a vertical position or removing it entirely from interior 11 so that the rigid insert no longer rests upon sidewalls 8 and bottom 10 allows sidewalls 8 to fold horizontally outward so that sidewalls 5 fold inward toward bottom 10 of top tote body 21.

As illustrated in FIG. 7, collapsed top tote body 27 is shown in a collapsed state in accordance with this invention. In the collapsed state, sidewalls 8 fold outwardly away from bottom 10 so that sidewalls 5 fold inwardly and come into contact with bottom 10. FIG. 7 collapsed top tote body 27 demonstrates the collapsed state when flaps 16 and panel 17 of rigid insert 28 are not placed in frictional contact with sidewalls 8 and bottom 10 of collapsed top tote body 27.

Securing the rigid insert 28 in the interior 11 of top tote body 21 is achieved with securing devices 1 located the upper corners of sidewalls 5, 8. The securing devices 1 are achieved preferably by using loops that can be made of the same material or other flexible material sewn in the upper corners formed by sidewalls 5, 8 but the securing may also be achieved by using buttons, Velcro, snaps, or any other means known to those skilled in the art.

As shown in FIGS. 1, 2, 3, and 7, two handles 4 are sewn onto the exterior of sidewalls 5. Handles 4 are preferably made of the flexible non-woven polypropylene and sewn onto sidewalls 5 in the area between top edge 3 and bottom edge 6. Handles 4 can be made of other flexible material, such as canvas, leather, polyvinyl chloride, or can be made of non-flexible material and located at any point between top edge 3 and bottom edge 6. Handles 4 can be provided in a number of other ways readily apparent to those skilled in the art.

Figure 8:
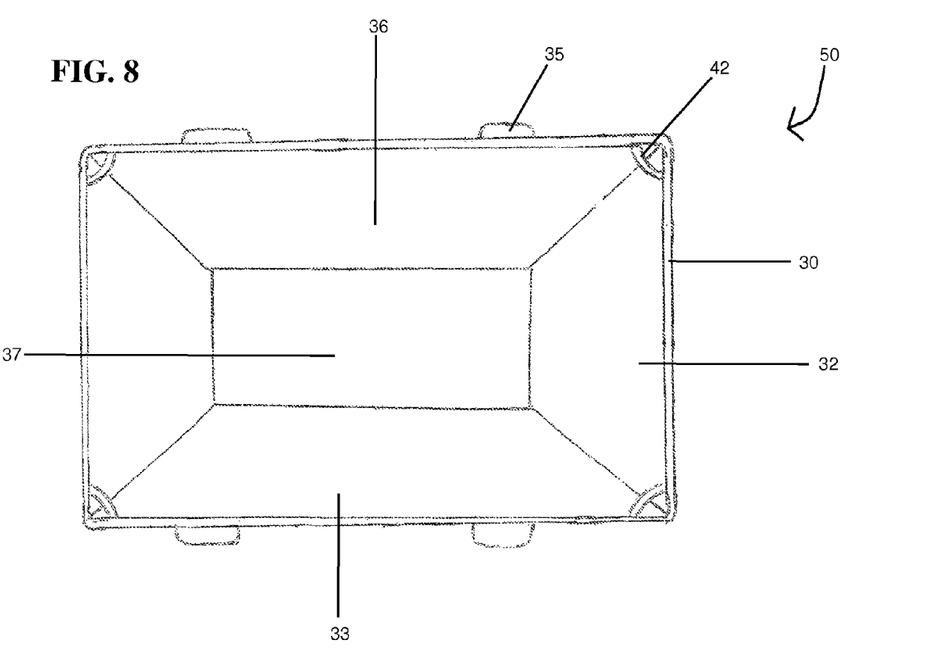
FIG. 8 is a top view of the bottom tote of the two-tote stacking reusable bag system in accordance with this invention.
Figure 9:
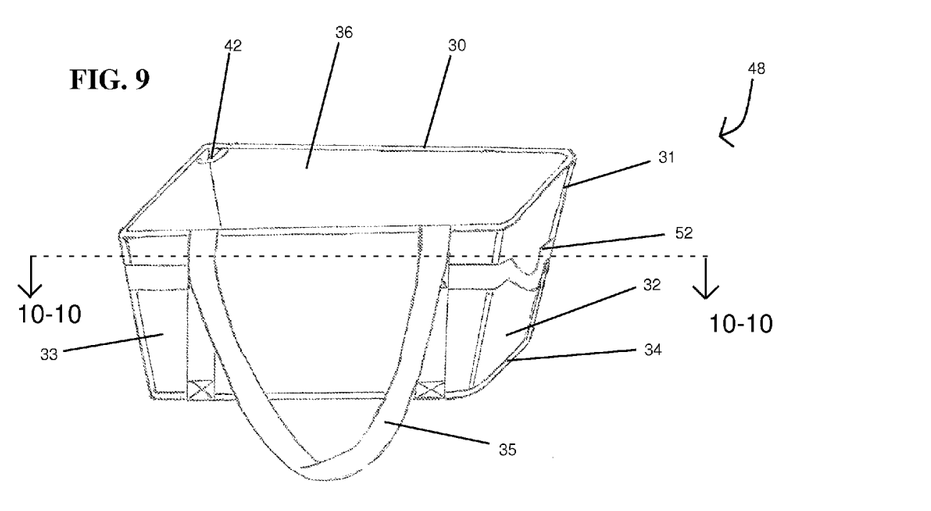
FIG. 9 is a side view of the bottom tote of the two-tote stacking reusable bag system in a self-supporting state in accordance with this invention.

As illustrated in FIG. 8, bottom tote body 50 has a bottom 37, two opposing flexible sidewalls 32, and two opposing rigid sidewalls 33. As illustrated in FIG. 9, bottom tote body 48 sidewalls 32 and 33 are permanently joined to the adjacent sidewall along both its vertical edges 31 to form a contiguous peripheral rectangular-shaped ring. Each sidewall 32 and 33 is also permanently attached to bottom 37 along bottom edges 34, which form the outer edge of bottom 37.

The union between sidewalls 32 and 33 along vertical edges 31 and between sidewalls 32, 33 along bottom edges 34 establishes a bottom tote body 48 that is integral. Attachment of sidewalls 32 with sidewalls 33 or of sidewall 32, 33 with bottom 37 is achieved by stitching, but adhesive or any other manner for connecting the walls and bottom known to those skilled in the art may be used.

Figure 10:
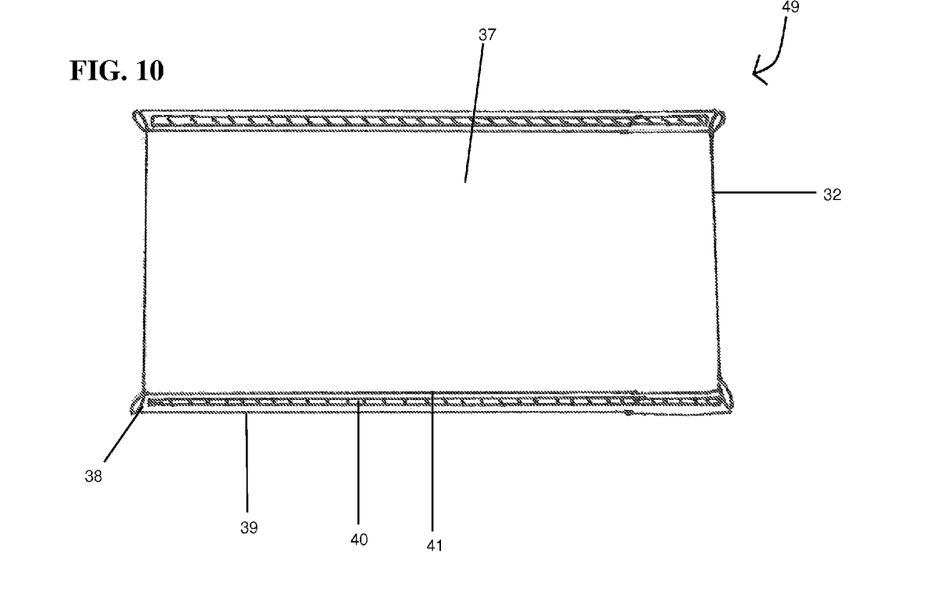
FIG. 10 is a top sectional view of the bottom tote of the two-tote stacking reusable bag system taken along horizontal section line 10-10 in FIG. 9.
Figure 11:
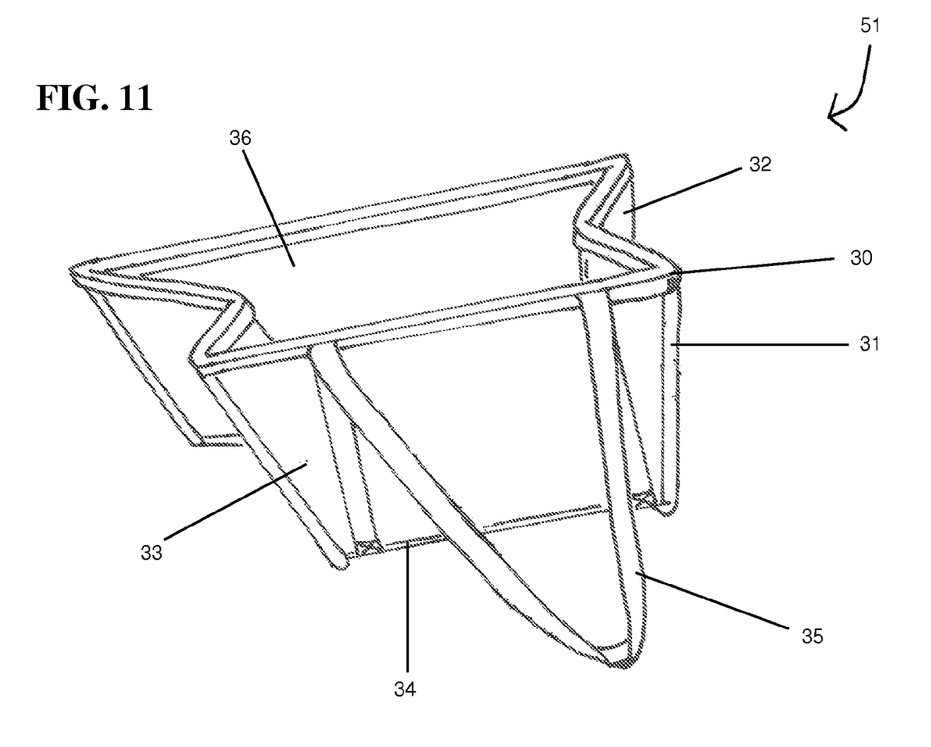
FIG. 11 is a perspective view of the bottom tote of the tote of the two-tote stacking reusable bag system in FIG. 9 being collapsed after the rigid insert has been removed.

Sidewalls 33 are rigid and situated opposite from each other within bottom tote body 50. Sidewalls 33 are substantially congruent and extend up from the bottom edge 34. Each of sidewalls 33 is comprised of two opposing pieces of material with a hollow space between them to form a full-wall pocket 38 as shown in FIG. 10. Full-wall pocket 38 is formed from first inner-wall 41 and first outer-wall 39 being joined along vertical edges 31 and bottom edges 34. Full-wall pocket 38 is sized to receive a rigid full-wall board 40. Each full-wall board 40 is preferably thin with a height and width slightly less than the corresponding dimensions of the receiving full-wall pocket 38.

After full-wall boards 40 have been embedded within the full-wall pockets 38 of each rigid sidewalls 33, full-wall boards 40 are secured within full-wall pockets 38 by joining first inner-walls 41 to first outer-walls 39 along top edges 30.

Figure 12:
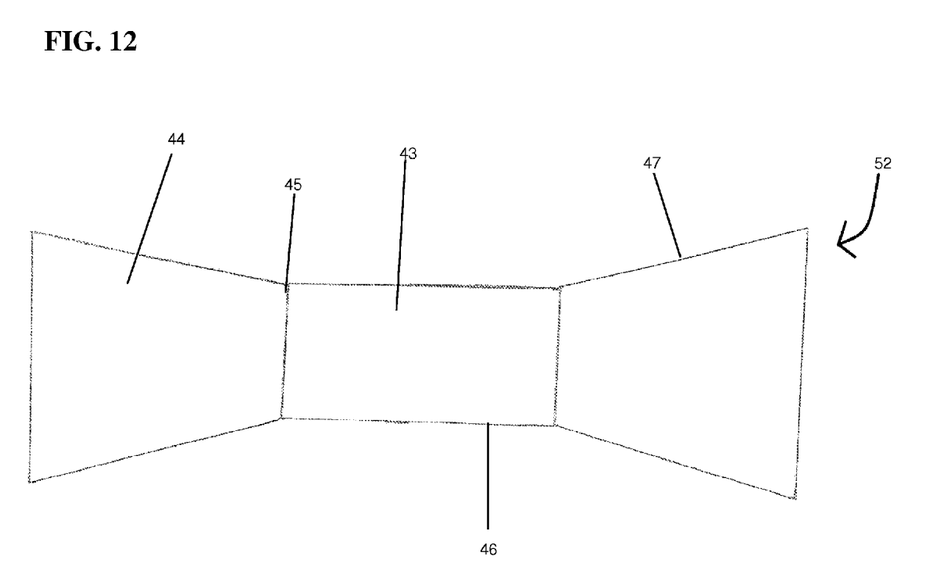
FIG. 12 is a top view of the removable rigid insert for the bottom tote of the two-tote stacking reusable bag system in accordance with this invention.

Each full-wall board 40 and rigid insert body 52 provide reinforcement to sidewalls 32 and bottom 37. This reinforcement allows the flexible material of sidewalls 32 to stand upright when bottom tote body 50 is erected. Full-wall boards 40 and rigid insert 52 also give sidewalls 32 and bottom 37 rigidity needed to increase the durability and the useful life of bottom tote body 50. Moreover, such rigidity ensures that bottom tote body 50 returns substantially to its intended shape despite being repeatedly collapsed and then re-erected. Boards 40 and rigid insert 52 are preferably made from cardboard but as noted particle board, sheet metal, plastic or other rigid material can be used depending on the needed functionality and cost constraints.

Flexible sidewalls 32 are likewise opposite each other, substantially congruent and extend up from the bottom edge 36. Each second sidewall is attached along vertical edges 31 and bottom edges 34.

As illustrated in FIG. 12, the rigid insert for bottom tote body 48 is comprised of bottom tote body 52, which is made from rigid cardboard. The rigid insert, body 52 is comprised of two articulated walls or flaps 44 with the height and width slightly less than sidewalls 32 and a panel 43 with the height and width slightly less than bottom 37. The two flaps 44 are opposing to each other and adjacent to panel 43. The flaps 44 and panel 43 are joined by seams 45. As shown in FIG. 12, attachment of the rigid insert flaps 44 with rigid panel 43 are achieved by preferably using the same material and joining flaps 44 and panel 43 along seam 45 with stitches. These elements may also be joined using adhesive or any other manner known to those skilled in the art. It is only required to join adjacent portions without restricting flap movement along the rigid insert seams 45.

Figure 13:
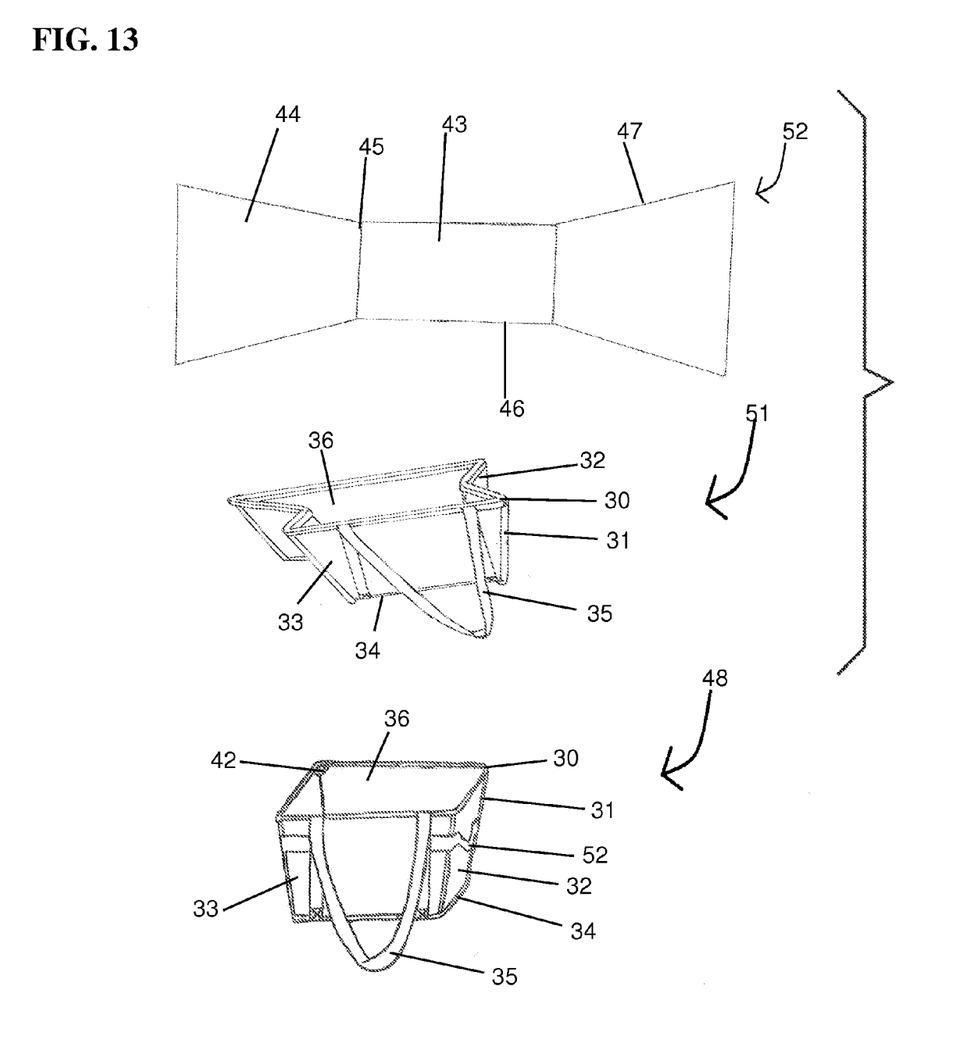
FIG. 13 is a perspective view of the bottom tote of the two-tote stacking reusable bag system demonstrating the reusable bag going from a collapsed to an erect state.

As shown in FIG. 13, to achieve the self-supporting state, of bottom tote body 48 sidewalls 32 and bottom 37 of bottom tote body 48 receive rigid insert 52, such that rigid insert flaps 44 and rigid insert panel 43 are placed in frictional contact sidewalls 32 and bottom 37 of bottom tote body 48, respectively. The rigid insert flaps 44 are held in place with securing loops 42 sewn in the upper corners of bottom tote body 48, by wrapping the securing loops 42 around the corners of rigid flaps 44. When the securing loops 42 are wrapped around rigid flaps 44, the rigid flaps 44 provide rigidity to sidewalls 32 of bottom body 48. The self-supporting state for bottom tote body 48 is achieved when sidewalls 32, 33 and bottom 37 are rigid and/or are in frictional contact with rigid insert 52 simultaneously. Pivoting the rigid insert to a vertical position or removing it entirely from interior 36 so that the rigid insert no longer rests upon sidewalls 32 and bottom 37 allows sidewalls 32 to fold horizontally outward so that sidewalls 33 fold inward toward bottom 37 of bottom tote body 48.

As illustrated in FIG. 13 collapsed bottom tote body 51 is shown in a collapsed state in accordance with this invention. In the collapsed state sidewalls 32 fold outwardly away from bottom 37 so that sidewalls 33 fold inwardly and come into contact with bottom 37. FIG. 13 collapsed bottom tote body 51 demonstrates the collapsed state when flaps 44 and panel 43 of rigid insert 52 are not placed within the interior 36 of body 51 and are not in frictional contact with sidewalls 32 and bottom 37 of body 51.

Securing the rigid insert 52 in the interior 36 of bottom tote body 50 is achieved with securing devices 42 located in the upper corners of sidewalls 32 and 33. The securing devices 42 are achieved preferably by using loops that can be made of the same material or other flexible material sewn in the upper corners formed by sidewalls 32, 33 but the securing may also be achieved by using buttons, Velcro, snaps, or any other means known to those skilled in the art.

As shown in FIGS. 1, 2, 8, 9 and 13, handles 35 are sewn onto the exterior sidewalls 33. Handles 35 are preferably made of the flexible non-woven polypropylene and sewn onto sidewalls 33 in the area between top edges 30 and bottom edge 34. Handles 35 on bag 48 can be made of other flexible material, such as canvas, leather, polyvinyl chloride or can be made of non-flexible material and located at any point between top edges 30 and bottom edges 34. Handles 35 can be provided in a number of other ways readily apparent to those skilled in the art.

As illustrated in FIG. 2 top tote body 21 and bottom tote body 54 are shown in a stacked state body 23 in accordance with this invention. Vertical edge 7, bottom edge 6, and sidewalls 5, 8 of top tote body 21 are in contact with the interior of sidewalls 32, 33 of bottom tote body 54 to create the stacked state body 23 in accordance with this invention. The dimensions of top tote body 21 and bottom tote body 54 have a ratio that allows contact between the bags, such that top tote body 21 is suspended in the top opening 36 of bottom tote body 54. The ratio to create the stacked state body 23 is achieved by the area of bottom 10 of top tote body 21 being equal to the area of the top opening 36 of bottom tote body 54 at a predetermined height between top edges 30 and bottom edges 34. The ratio between bottom 10 and top opening 36 create an opening large enough to receive the top tote body 21, but small enough to restrict the top tote body 21 from moving downward in a vertical direction beyond the predetermined height between top edges 30 and bottom edges 34 of bottom tote body 54. More specifically sidewalls 5 and 33, rigid inserts 28 and 52, bottom 10 of body 21, top opening 36 of bag 54, sidewalls are all in contact with top tote body 21 when it is stacked in the top opening 36 of bottom tote body 54. Sidewalls 5 and 32, 8 and 33, and bottom 10 and top opening 36 are also in contact. Additionally, insert flaps 16 and panel 17 of rigid insert body 28 are in contact with sidewalls 8 and bottom 10 of top tote body 21 and insert flaps 44 and panel 43 of rigid insert body 52 are in contact with sidewalls 32 and bottom 37. As a result when in stacked state body 23 top tote body 21 is stacked in the top opening 36 of bottom tote body 54 movement of top tote body 21 is restricted in both downward and horizontal directions.

While the principles of the invention have been shown and described in connection with specific embodiments, it is to be understood that such embodiments are by way of example and are not limiting.

The invention claimed is:

1. A reusable bag system comprising:
   a body of at least two totes;
   at least one tote being a top tote and at least one tote being a bottom tote;
   each tote individually having a closed bottom, two opposed and substantially identical first sidewalls and two opposed and substantially identical second sidewalls, the bottom being bound to each sidewall along a bottom edge, and the body defining an interior having a top opening;
   a hard full-wall board embedded in at least one of the two first sidewalls;
   a rigid removable insert for the bottom tote, wherein seated within the interior of the bottom tote and supported by at least one second sidewall and the bottom, comprised of at least one flap of similar shape and dimension to at least one second sidewall and a panel of similar shape and dimension to the bottom, which enables the bottom tote to be a rigid structure, wherein moving the rigid removable insert away from the second sidewall and bottom enables the bottom tote to be collapsed;
   a rigid removable insert for the top tote, wherein seated within the interior of the top tote and supported by at least one second sidewall and the bottom, comprised of at least one flap of similar shape and dimension to at least one second sidewall and a panel of similar shape and dimension to the bottom which enables the top tote to be a rigid structure, wherein seating the rigid removable insert in the interior of the top tote also enables the top tote to be stacked vertically in the interior of the bottom tote, wherein the top tote is partly suspended within the interior of the bottom tote at a predetermined height by frictional contact created when the exterior sidewalls of the top tote come in contact with the interior sidewalls of the bottom tote, wherein the frictional contact between the top and bottom totes is achieved by the dimensions of the bottom of the top tote being equal in dimension to an area between the top and bottom edges of the bottom tote, wherein moving the rigid removable insert away from the second sidewall and bottom enables the top tote to be collapsed.

2. The reusable bag system of claim 1 wherein the body is two totes.

3. The reusable bag system of claim 2 wherein the body is a top tote and a bottom tote.

4. The reusable bag system of claim 3 wherein each top and bottom tote has one set of two first sidewalls and one set of two second sidewalls that are affixed to a bottom and extend away from the bottom in substantially the same direction.

5. The reusable bag system of claim 4 wherein each first sidewall forms a full-wall pocket to receive one full-wall board.

6. The reusable bag system of claim 3 wherein each has a rectangular top edge in a substantially horizontal plane.

7. The reusable bag system of claim 3 wherein each sidewalls that are bound to adjacent sidewalls along a vertical edge and each sidewall is attached with respect to the bottom along a bottom edge whereby each tote has an integral body that can be erected or collapsed.

8. The reusable bag system of claim 3 wherein each further comprises a handle on at least one sidewall.

9. The reusable bag system of claim 3 wherein each has a rigid insert that can be removed from the interior of the tote body.

10. The reusable bag system of claim 3 wherein each has at least one means to secure the removable rigid insert on at least one sidewall of the interior of each tote.

11. The reusable bag system of claim 10 wherein the rigid removable insert seated in the interior of the body creates an erect structure.

12. The reusable bag system of claim 3 wherein each is stacked vertically and the top tote partially suspended within the interior of the bottom tote and said top tote is both a top and bottom tote and said bottom tote is both a top and bottom tote when in a stacked state and is both suspended in the interior of a bottom tote and receiving the bottom of a top tote.

13. A reusable bag system comprising:
    a body of two totes;
    a top tote and a bottom tote;
    each tote individually having a closed bottom, two opposed and substantially identical first sidewalls and two opposed and substantially identical second sidewalls, the bottom being bound to each sidewall along a bottom edge, and the body defining an interior having a top opening;
    each tote individually having a hard full-wall board embedded in each of the two first sidewalls;
    a rigid removable insert for the bottom tote, wherein seated within the interior of the bottom tote and supported by the two second sidewalls and the bottom, comprised of two flaps of similar shape and dimension of the two second sidewalls and a panel of similar shape and dimension of the bottom, which enables the bottom tote to be a rigid structure, wherein moving the rigid removable insert away from the two second sidewalls and bottom enables the bottom tote to be collapsed;
    a rigid removable insert for the top tote, wherein seated within the interior of the top tote and supported by the two second sidewalls and the bottom, comprised of two flaps of similar shape and dimension of the two second sidewalls and a panel of similar shape and dimension of the bottom, which enables the top tote to be a rigid structure, wherein seating the rigid removable insert in the interior of the top tote also enables the top tote to be stacked vertically in the interior of the bottom tote, wherein the top tote is partly suspended within the interior of the bottom tote at a predetermined height by frictional contact created when the exterior sidewalls of the top tote come in contact with the interior sidewalls of the bottom tote, wherein the frictional contact between the top and bottom totes is achieved by the dimensions of the bottom of the top tote being equal in dimension to an area between the top and bottom edges of the bottom tote, wherein moving the rigid removable insert away from the two sidewalls and the bottom of the top tote enables the top tote to be collapsed.

14. The reusable bag system of claim 13 wherein a full-wall board is embedded in each of the first sidewalls.

15. The reusable bag system of claim 13 wherein a rigid removable insert for the bottom tote has two flaps of similar shape and dimension of the two second sidewalls and a panel of similar shape and dimension of the bottom, the rigid removable insert when seated in the interior of the bottom tote enables the bottom tote to be a rigid structure, wherein moving the rigid removable insert away from the two second sidewalls and bottom enables the bottom tote to be collapsed.

16. The reusable bag system of claim 13 wherein a rigid removable insert for the top tote has two flaps of similar shape and dimension of the two second sidewalls and a panel of similar shape and dimension of the bottom; the rigid removable insert wherein seated in the interior of the top tote enables the top tote to be a rigid structure, wherein seating the rigid removable insert in the interior of the top tote also enables the top tote to be stacked vertically in the interior of the bottom tote, wherein the top tote is partly suspended within the interior of the bottom tote at a predetermined height by frictional contact created when the exterior sidewalls of the top tote come in contact with the interior sidewalls of the bottom tote, wherein the frictional contact between the top and bottom totes is achieved by the dimensions of the bottom of the top tote being equal in dimension to an area between the top and bottom edges of the bottom tote, wherein moving the rigid removable insert away from the two sidewalls and the bottom of the top tote enables the top tote to be collapsed.

* * * * *